United States Patent [19]

LaBar et al.

[11] 3,765,914
[45] Oct. 16, 1973

[54] SILICEOUS BONDED REFRACTORY
[75] Inventors: Richard G. LaBar, Youngstown, N.Y.; George R. Hansen, Edison, N.J.
[73] Assignee: The Carborundum Company, Niagara Falls, N.Y.
[22] Filed: June 28, 1971
[21] Appl. No.: 157,624

[52] U.S. Cl.................... 106/57, 106/58, 106/65, 106/66, 106/69
[51] Int. Cl............................................ C04b 35/48
[58] Field of Search .................. 106/57, 58, 65, 69, 106/66

[56] References Cited
UNITED STATES PATENTS

| | | | |
|---|---|---|---|
| 2,741,822 | 4/1956 | Udy | 106/58 |
| 2,942,991 | 6/1960 | Smith | 106/69 |
| 3,226,456 | 12/1965 | Ryshkewitch et al | 106/57 |

*Primary Examiner*—James E. Poer
*Attorney*—David E. Dougherty et al.

[57] ABSTRACT

The strength and density of fired articles made from oxidic refractories, such as those with high contents of alumina, zirconia, magnesia, silica, chromia and the like, are improved by the addition of about ½ to 3 weight percent of finely divided silicon metal. When the refractory mixtures are fired at 2,200°–3,200° F in an oxidizing atmosphere, the silicon reacts with oxygen and other constituents of the mix to form a strong refractory siliceous bonding network.

4 Claims, No Drawings

SILICEOUS BONDED REFRACTORY

BACKGROUND OF THE INVENTION

This invention relates to compositions of matter and articles composed essentially of oxidic material with siliceous bonding agents, and the method of manufacture of these articles, particularly those of refractory compositions.

The use of oxidic materials for refractories is well-known. The abundance and cheapness of this class of materials, combined with their high melting points and chemical stabilities at high temperatures, have resulted in their widespread use in various forms and applications in science and industry. Compositions containing such oxidic materials as alumina, magnesia, zirconia and chromia, as well as related minerals such as spinels, mullites, forsterites, cordierite etc., have been found eminently suitable for high temperature furnace linings and insulations as well as for special shapes useful or around furnaces or similar high temperature applications.

While a refractory body must be able to withstand high temperatures, it should also have the ability to resist sudden changes in temperature without cracking or warping. It must also have the necessary mechanical strength to permit its use in required refractory constructions. Many refractory compositions have been developed in an effort to fulfill these requirements. In many cases, however, the resulting refractory, while superior in some respects, is deficient in others. Because of this there is a continual need for improved refractory bodies of new compositions which will meet those demands of a special nature which require a combination of properties not to be found in present refractories. The present invention provides refractory bodies or shapes having distinctive compositions which are made by practical methods. When properly processed the bodies are characterized by having high density, strength stability at high temperatures, and stability in the presence of molten glasses, metallurgical slags, alkali vapors and corrosive gases.

SUMMARY OF THE INVENTION

The present invention provides refractory bodies comprising refractory oxidic materials selected from the group consisting of alumina, magnesia, zirconia, silica, chromia, mullite, spinel, forsterite and mixtures thereof, with small amounts of finely divided silicon metal added as a bonding material. The mixture may be shaped into articles by any of the well-known methods of formation, such as mechanical compaction or pressing and then fired in an oxidizing atmosphere at a temperature and period of time sufficient to convert the silicon metal to a siliceous bond, giving high density and strength to the resulting refractory structure.

DESCRIPTION OF THE INVENTION

The refractory bodies of this invention may comprise mixtures of refractory oxides such as alumina, zirconia, magnesia, chromia or silica, alone or in mixtures, as well as refractory oxidic materials such as mullites, spinels and forsterites. The refractory composition may comprise from 85 to 95 percent weight percent of refractory aggregate or grain, with the remainder comprising 1 to 15 weight percent of silica which may be fused or flint, along with small amounts of clay plasticizers, calcined alumina, refractory fines, temporary binders and finely divided silicon metal. Oxides of metals such as boron, sodium, magnesium, calcium, titanium, vanadium, chromium, iron, nickel and zirconium may also be present as impurities in concentrations of less than about one weight percent. The silicon metal aids in the attainment of high density in these refractory bodies through the process of oxidation during firing and subsequent reaction with other oxides to form a refractory siliceous bond in situ. This bond is particularly tenacious if the oxidation of the silicon takes place after it becomes welded to and before it melts and diffuses into the refractory oxide particles. The silicon metal is ground to at least 200 mesh but may be supplied as 600 mesh and finer. The content of silicon metal added to the refractory mix may vary from about 1/2 to 3 weight percent. Water may be added, if desired, and the mix shaped into the desired form, using any of the well-known methods of formation, such as mechanical compaction or pressing. The formed article is then dried and fired. During firing it is necessary to expose the refractory to a neutral or an oxidizing atmosphere at temperatures of 2,200° F and above to develop complete bonding. During this firing about 1 to 6 weight percent of silica is formed in the article by the oxidation of the silicon bonding metal.

While the description above sets forth certain broad ranges for material compositions and processing conditions, it should be understood that narrower ranges of material compositions and reaction conditions may give a refractory product with superior properties. In a preferred embodiment of the invention, a mixture consisting of 85 to 95 weight percent of tabular, fused or calcined alumina, 1 weight percent of 600 mesh silicon metal 0 to 4 weight percent of clay and 0 to 5 weight percent of flint silica is molded, dried and fired at 2,200°–2,300° F in an oxidizing atmosphere for at least 1 hour, followed by a final firing at a temperature in excess of 2,600° F. The resulting refractory articles possess outstanding strength and corrosion resistance to slags and metals at high temperature. Three of these compositions are shown in Table I. The materials were first thoroughly mixed and tempered with water to form a mixture with a suitable consistency for forming. After forming in suitable molds, the resulting shapes were dried and fired at 2,200°–2,300° F for an hour, followed by a final firing at a temperature above 2,600° F. Physical properties of the articles after firing are shown at the bottom of the table.

TABLE I

| Compositions | A wt.% | B wt.% | C wt.% |
| --- | --- | --- | --- |
| Tabular Alumina | 85 | 90 | 90 |
| Calcined Alumina (−325 mesh) | 5 | 5 | 5 |
| Potter's Flint Silica | 5 | 4 | 3 |
| Kaolin Clay | 4 | — | — |
| Silicon Metal (600 mesh) | 1 | 1 | 2 |
| Fired Bulk Density (g/cc) | 3.00 | 2.97 | 3.02 |
| Apparent Porosity (%) | 12.0 | 14.7 | 10.1 |
| Modulus of Rupture (psi) (Flexural Strength) | | | |
| R.T. | 2200–2800 | 6428 | 5079 |
| 1200°C | 5200 | — | — |
| 1300°C | 3360 | 4700 | 3825 |
| 1400°C | 2300 | — | — |

In a second series of tests, the effects of varying silicon content were evaluated. Table II shows the results of four tests on mixtures in which silicon content was varied while the other components remained essentially the same. The procedures for mixing, molding and firing the mixtures were the same as described for those shown in Table I; physical properties of the second series of fired articles are shown at the bottom of Table II.

TABLE II

| Compositions | D wt.% | E wt.% | F wt.% | G wt.% |
|---|---|---|---|---|
| Tabular Alumina | 85 | 85 | 85 | 85 |
| Calcined Alumina (−325 mesh) | 5 | | 5 | 5 |
| Potter's Flint Silica | 5 | 5 | 5 | 5 |
| Kaolin Clay | 4 | 4 | 4 | 4 |
| Silicon Metal (600 mesh) | — | 0.5 | 1.0 | 1.5 |
| Fired Bulk Density (g/cc) | 2.94 | 2.96 | 2.98 | 2.92 |
| Apparent Porosity (%) | 16.9 | 15.2 | 15.0 | 17.1 |
| Modulus of Rupture (psi) (Flexural Strength) | 2050 | 2550 | 2700 | 2150 |

Although good refractory articles have been made with silicon metal additions up to about 3 weight percent, the optimum addition is from 1/2 to 1 percent. This proportion of silicon gives refractory structures having a graded distribution of high alumina grog in a matrix of refractory glass and ultrafine mullite crystals. An oxidizing atmosphere during firing is necessary since the silicon oxidizes and then combines with other oxides present to form glass and a microcrystalline silicate bonding network in the resulting refractory article. The bonding network may comprise less than about 15 weight percent of the final fired structure.

We have described the making of molded shapes in which the article is molded and fired in the exact shape and form in which it is intended for use, such as in firebrick or similar refractory shapes. Another way of making and using the refractory bodies of the invention is to mold raw batches of green material into briquettes or other shapes and fire as previously described. After firing, the bodies may be crushed to granular form for use as a high temperature insulation material. The granules may also be used as a loose filtering media or as catalyst or catalyst carriers. The granular material can also be bonded by means of sintered metals, vitreous or ceramic bonds or other bonding materials to form articles suitable for many industrial uses.

What is claimed is:

1. A bonded refractory body comprising (1) oxidic material selected from the group consisting of alumina, magnesia, zirconia, silica, chromia, mullite, spinel and forsterite and mixtures thereof; and (2) an oxidic siliceous bonding material, comprising in situ oxidized silicon metal, the amount of said bonding material comprising less than about 15 weight percent of the refractory body.

2. A body according to claim 1 which comprises from about 85 to about 95 weight percent alumina, from 0 to about 4 weight percent clay, from about 1 to about 15 weight percent silica and less than about one weight percent of oxidic impurities, said silica comprising from about 1 to about 6 weight percent of oxidized silicon metal.

3. A body according to claim 1 in which the refractory oxidic material comprises fused and tabular alumina.

4. A bonded refractory body comprising alumina bonded by from about 1 to about 6 weight percent in situ oxidized silicon metal.

* * * * *